(12) United States Patent
Johnson

(10) Patent No.: US 8,140,694 B2
(45) Date of Patent: Mar. 20, 2012

(54) METHOD AND APPARATUS FOR EFFECTING SECURE COMMUNICATIONS

(75) Inventor: Ted C. Johnson, Issaquah, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2704 days.

(21) Appl. No.: 10/800,828

(22) Filed: Mar. 15, 2004

(65) Prior Publication Data
US 2005/0204157 A1  Sep. 15, 2005

(51) Int. Cl.
*G06F 15/16* (2006.01)
*G06F 15/173* (2006.01)

(52) U.S. Cl. ........ 709/230; 709/203; 709/223; 709/224; 709/225; 709/226; 709/227; 709/228; 709/229

(58) Field of Classification Search .................. 709/203, 709/223–226, 227–229
See application file for complete search history.

(56) References Cited

U.S. PATENT DOCUMENTS

| | | | | |
|---|---|---|---|---|
| 5,854,841 A * | 12/1998 | Nakata et al. | | 713/152 |
| 5,950,195 A * | 9/1999 | Stockwell et al. | | 707/4 |
| 6,205,479 B1 * | 3/2001 | Dulai et al. | | 709/225 |
| 6,219,706 B1 * | 4/2001 | Fan et al. | | 709/225 |
| 6,457,061 B1 * | 9/2002 | Bal et al. | | 709/245 |
| 6,587,866 B1 * | 7/2003 | Modi et al. | | 718/105 |
| 6,591,299 B2 * | 7/2003 | Riddle et al. | | 709/224 |
| 6,609,159 B1 * | 8/2003 | Dukach et al. | | 719/331 |
| 6,615,263 B2 * | 9/2003 | Dulai et al. | | 709/225 |
| 6,654,807 B2 * | 11/2003 | Farber et al. | | 709/225 |
| 6,859,835 B1 * | 2/2005 | Hipp | | 709/227 |
| 6,983,332 B1 * | 1/2006 | Lou et al. | | 709/246 |
| 7,043,564 B1 * | 5/2006 | Cook et al. | | 709/246 |
| 7,054,935 B2 * | 5/2006 | Farber et al. | | 709/226 |
| 7,194,769 B2 * | 3/2007 | Lippmann et al. | | 726/25 |
| 7,254,133 B2 * | 8/2007 | Govindarajan et al. | | 370/394 |
| 2002/0049857 A1 * | 4/2002 | Farber et al. | | 709/245 |
| 2002/0099850 A1 * | 7/2002 | Farber et al. | | 709/245 |
| 2002/0112076 A1 * | 8/2002 | Rueda et al. | | 709/245 |
| 2002/0143939 A1 * | 10/2002 | Riddle et al. | | 709/224 |
| 2003/0065950 A1 * | 4/2003 | Yarborough | | 713/201 |
| 2003/0110273 A1 * | 6/2003 | Ventura | | 709/229 |
| 2004/0008681 A1 * | 1/2004 | Govindarajan et al. | | 370/394 |
| 2004/0019682 A1 * | 1/2004 | St. Pierre | | 709/227 |
| 2004/0019689 A1 * | 1/2004 | Fan | | 709/230 |
| 2004/0019804 A1 * | 1/2004 | St. Pierre | | 713/201 |
| 2004/0044777 A1 * | 3/2004 | Alkhatib et al. | | 709/228 |
| 2004/0044778 A1 * | 3/2004 | Alkhatib et al. | | 709/228 |
| 2004/0086123 A1 * | 5/2004 | Neves et al. | | 380/270 |
| 2005/0044242 A1 * | 2/2005 | Stevens et al. | | 709/228 |
| 2005/0138413 A1 * | 6/2005 | Lippmann et al. | | 713/201 |
| 2005/0198334 A1 * | 9/2005 | Farber et al. | | 709/229 |
| 2006/0031514 A1 * | 2/2006 | Bousis | | 709/227 |
| 2006/0203808 A1 * | 9/2006 | Zhang et al. | | 370/352 |
| 2006/0218265 A1 * | 9/2006 | Farber et al. | | 709/223 |

* cited by examiner

*Primary Examiner* — Djenane M Bayard
*Assistant Examiner* — Umar Cheema

(57) ABSTRACT

A technique to effect secure communications with a server application, such as server applications that are accessible on the Internet. In one embodiment, a client connection is detected at a first port. The client is provided with a decoy port number. A server provides services to the client on a second port that is mapped to the decoy port number.

22 Claims, 3 Drawing Sheets

METHOD AND APPARATUS FOR EFFECTING SECURE COMMUNICATIONS

BACKGROUND

There has been a disconcerting increase in successful attacks by hackers on servers that are installed on the world-wide web (www) or on the Internet. Internet-based servers are known to be particularly susceptible to attack, in large part because Internet server applications of a particular type habitually "listen" on the same port number, irrespective of the server computer on which the application is executed. (A port number, here, does not connote correspondence to a physical port. Rather, a port number specifies an index into a software data structure (an array, for example) that exists in the server. In this sense, a port number is analogous to a telephone extension in an office. In order to access a server application that resides on a server computer, one must specify the port number (qua extension) on which the application listens.) The port on which a given server type is known to listen has become referred to in the art as the "well-known port number." For example, the Telnet server's well-known port number is tcp/23. (As is known, Telnet refers to a client program that implements the Telnet protocol. The Telnet protocol, in turn, is a protocol in the TCP/IP (Transmission Control Protocol/Internet Protocol) suite that enables an Internet user to log on to and to enter commands on a remote computer that is linked to the Internet, as if the user were exercising a text-based terminal directly attached to the computer). Consequently, with no more than minimal ingenuity, an attacker may be able to break into a Telnet server application on, for example, a server having the address www.acme.com. The attacker merely uses the default client command "telnet www.acme.com" in order to obtain access to the Telnet server.

Having achieved access to the server, the hacker may pursue one or more of a number of hacking strategies. For example, the hacker may, by brute force, attempt to determine applicable username/password combinations. Alternatively, the hacker may attempt to create a buffer overflow. In this approach, the hacker seeks to create anomalous server performance through, for example, transmitting to the server a carefully crafted packet that exceeds the bounds of an applicable server buffer. In addition, the hacker may elect to exploit various other server defects. This strategy is unwittingly assisted by the efforts of entities, otherwise well intentioned, that periodically publicly announce newly discovered software defects.

It is evident from the above that, given the resourcefulness of those who would hack into, or otherwise acquire unauthorized access to, networked servers, including servers linked to the Internet or to the www, any technique that may hinder unauthorized access to a networked server represents a salutary advance in the state of the art.

SUMMARY OF THE INVENTION

In one embodiment, a method of effecting secure communications between a server and a client comprises detecting a client connection at a first port, providing the client with a decoy port number, and providing services to the client on a second port.

BRIEF DESCRIPTION OF THE DRAWINGS

The subject technique for effecting secure communications may be better understood by, and its many features, advantages and capabilities made apparent to, those skilled in the art with reference to the Drawings that are briefly described immediately below and attached hereto, in the several Figures of which identical reference numerals (if any) refer to identical or similar elements, and wherein.

Figure 1:
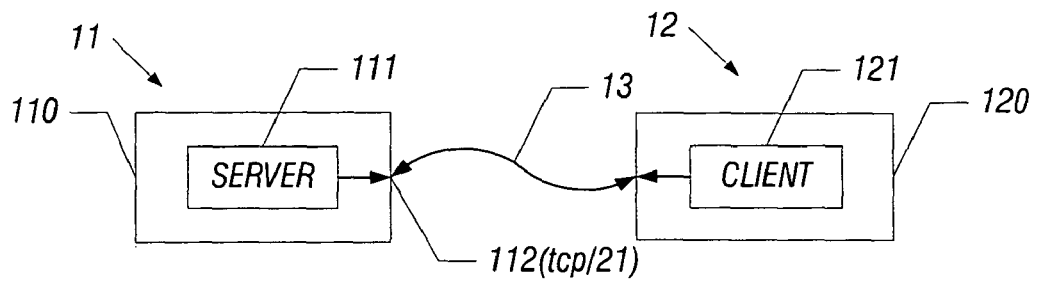
FIG. 1 is a block diagram of a client/server system that attempts to achieve a measure of security by hiding a server application on a secret port.

Skilled artisans appreciate that elements in Drawings are illustrated for simplicity and clarity and have not (unless so stated in the Description) necessarily been drawn to scale. For example, the dimensions of some elements in the Drawings may be exaggerated relative to other elements to promote and improve understanding of embodiments of the invention.

DETAILED DESCRIPTION

For a thorough understanding of the subject technique for effecting secure communications, reference may be had to the following Detailed Description, including the appended Claims, in connection with the above-described Drawings.

As will be made clear in this Detailed Description below, implementations inhere principally in a technique that substantially enhances the level of security that may be imparted to Internet servers and to other networked servers, including proprietary servers and servers that populate an intranet. (In this regard, it is useful to note that some embodiments will be described herein with respect to servers that are accessible via the Internet. However, be aware that the scope of the invention is not so limited and extends to all servers that are accessible on a communications network. Also, a definitional note: the term "server" has acquired at least two distinct meanings in the art. In one sense, a "server" may mean a machine, e.g., a computer or a processor, that provides services to a client application. Alternatively, "server" may mean a software program that is executed on the machine and that likewise provides services to a client application. Unless otherwise noted herein, the term "server" shall assume the latter meaning. When referring to machine, i.e., processor or computer, the term "server computer" shall be invoked. Similarly, a "client" here shall mean a process (including a program) that requests services provided by another process or program, e.g. service provided by a server. A "client computer" is, accordingly a computer on which a client resides or is executed.)

An arrangement consistent with this convention is depicted in FIG. 1. Therein a server system 11 comprises a server computer 110 on which there is installed a server application (server) 111. Server 111 may, when executed, provide a predetermined service to authorized client systems. As depicted in FIG. 1, a client system 12 comprises a client computer 120 on which there is installed a client application (client) 121. Server system 11 is coupled to client system 12 through a communications link 13. Although not specifically illustrated as such, communications link 13 may include the Internet. In the configuration of FIG. 1, server computer 110, www.acme.com, for example, may include an FTP (file transfer protocol) server 111 that listens on a well-known port 112, i.e., tcp/21. Client 121 typically knows that in order to access (receive FTP files from) server 111 on server comparator 110, port tcp/21 on www.acme.com must be accessed.

In contradistinction to the prevailing state of the art, a server in accordance with one embodiment of the invention may not habitually listen on a "well-known" port. For example, in the prevailing art, a Telnet server application typically listens on the well-known port tcp/23, irrespective of the server computer on which the Telnet application is installed. However, consistent with embodiments of the invention, a Telnet server, for example, will not, as might otherwise be expected, "listen" on any particular port. In addition, in accordance with some embodiments, assignment of the port number on which the Telnet server will be launched is delayed until momentarily prior to the time at which services provided by the server are requested by a client. Furthermore, even subsequent to a client request, the server is not launched on the "well-known" port, but is launched on, what appears to be from the perspective of a hacker, a random port. For example, in one embodiment of the invention, rather than being launched on tcp/23, a Telnet server may be launched on a (seemingly randomly selected) port within the range of valid unreserved ports between the addresses tcp/1024 and tcp/65535, for example.

In addition, in some embodiments, not only may a server listen on a port that appears to be randomly selected, but the port on which the server listens may be relocated frequently. In one embodiment, the random port assignment may be relocated immediately prior to each attempt by a client for a connection to the port. In order to further effectuate server security, port identification may be communicated to the client through the operation of a robust technique. The technique itself is substantially immune to attack strategies, including buffer overflow and others.

Figure 2A:
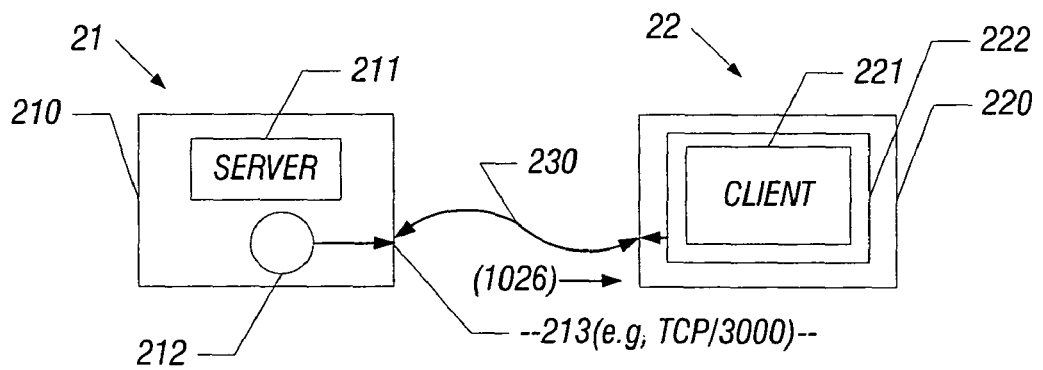
FIGS. 2A and 2B represent in graphical form steps undertaken, in one embodiment, to afford a client application access to a server on a secret port.
Figure 2B:
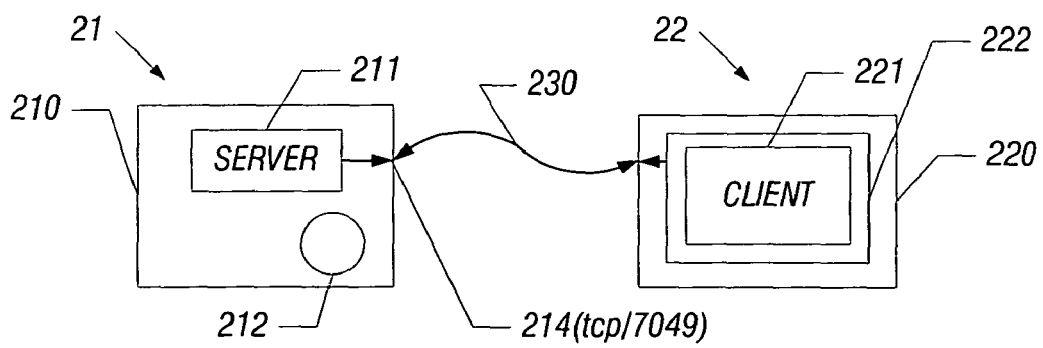

In the embodiment of FIGS. 2A and 2B, the server computer system 21 comprises one or more server applications 211 and a daemon 212, herein referred to as a "scrambler" or "scrambler daemon". For present purposes, scrambler daemon 212 may be considered to be a program, or a routine, that is associated with, but distinct from, server 211 and that performs functions ancillary to the execution of server 211. A number of the functions performed by scrambler daemon 212 are articulated below. In one embodiment, the scramble daemon operates without being called by a server, a client, or any other application. The scrambler daemon listens at a port 213 for initial connection attempts by a client. The scrambler is, in a sense, invisible to the client application and operates only to perform functions such as those indicated below. In one embodiment of the invention, the scrambler may be distinct and separate from server application, but the invention is not limited in this regard.

A client system 22 includes a client computer 220. Installed on client computer 220 there is included a wrapper script 222 around a (FTP (File Transfer Protocol), for example) client application 221. The FTP client application enables a user to upload and to download files to and from an FTP server computer using the File Transfer Protocol. Thus, when the FTP client application 221 is invoked (as, for example, by a user keying "ftp" on a keyboard), wrapper script 222 is initially invoked. Prior to launching the FTP client, the wrapper script (or wrapper) may perform a number housekeeping functions, examples of which are enumerated below.

In one embodiment of the invention, the wrapper script may be written in PERL (Protocol Extraction and Report Language). PERL is an interpreted software language that is based on C and several UNIX utilities. PERL is notable for its facility in handling features and for its effectiveness in extracting information from text files. Because PERL possesses the capacity to assemble a string and convey the string to an OS shell, PERL is well suited for administrative tasks, such as those performed by the subject scrambler. However, the invention is not limited by the programming language in which either the scrambler or the wrapper is written.

Scrambler daemon 212 and wrapper script 222 incorporate reciprocal secure tables, an example of which is illustrated below. The tables map (or, translate) available TCP port numbers on the server computer 210 to a seemingly random port number. Specifically, in one embodiment, when the scrambler receives a connection attempt from client application 221, the scrambler replies to the client with a decoy port number (e.g., "1026") and closes the connection on the scrambler port 213.

This sequence may be readily seen in FIG. 2A. The scrambler 212 that is associated with server 211 listens for connection attempts from prospective clients, such as client 221, on a port 213. In one embodiment, it is known, at least by authorized clients, that scrambler 212 listens for connection attempts on a predetermined port 213. Port 213 may have, for example, a port number of tcp/3000. In response to a connection attempt from client 221, scrambler 212 transmits a decoy port number, say tcp/1026, to client computer system 22. The decoy port number is provided to wrapper 222. As will become clear below, the decoy port number is a port number that enables an authorized user to determine a valid port number, i.e., to connect to a valid port. The decoy port number is of no use to an unauthorized user, such as a hacker.

That is, to an unauthorized third party, the decoy port number has no detectable meaning. However, both the client (FTP wrapper) and server (scrambler) contain an internal proprietary table that maps decoy port numbers, provided by the scrambler to the wrapper, to valid numbers on which the client 221 may obtain access to the server 211. An example of the table appears below:

| Decoy Port | Valid Port |
|---|---|
| 1,024 | 3942 |
| 1,025 | 42,111 |
| 1,026 | 7,049 |
| . | . |
| . | . |
| . | . |
| 65,534 | 1,028 |
| 65,535 | 11,099 |

Accordingly, when the scrambler provides (from port tcp/3000) the decoy port number tcp/1026, for example, both scrambler 212 and the client wrapper 222 are aware, by virtue of the table, that the decoy port number tcp/1026 is to be mapped to a valid port number tcp/7049.

As may be seen in FIG. 2B, subsequent to providing the decoy port number to the client, the scrambler daemon then launches the FTP server on a valid port 214, i.e., the port to which tcp/1026 is mapped. In FIG. 2B, valid port 214 is tcp/7049. After launching the server on port 214, the scrambler enters into a monitor mode. If no client successfully connects to the FTP server on port 214 within a predetermined interval of time (e.g., 60 seconds), then the scrambler will assume that triggering has occurred maliciously, or at least erroneously. This may occur as a result of a port scan that has strobed the scrambler's port 213 (tcp/3000). Upon detecting a failure to achieve a client connection in the allocated time interval, scrambler 212 will terminate execution of the FTP server on port tcp/7049 so as not to leave a dangling target.

Notice that in the embodiment described immediately above, monitoring for successful client connections is not predicated on access to the server source code. Rather, monitoring is successfully accomplished with standard operating system commands. For example, in the case of HP-UX, one may use a netstat command to determine whether the FTP server, for example, on port tcp/7049 transitions from the TCP "LISTEN" state to the TCP "ESTABLISHED" state. (Netstat commands are Unix commands that return statistics relevant to network operation, such as memory statistics, routing tables, etc.) A transition from "LISTEN" to "ESTABLISHED" signifies that a client has connected.

If a client does connect, the scrambler daemon will note the client address from netstat and verify, via the ftp log file, /usr/adm/xferlog, whether or not the client was able to log in successfully within the requisite predetermined interval. If not, the scrambler will terminate execution of the FTP server on port tcp/7049.

The procedures for monitoring Internet servers that provide other types of services, such as HTTP (Hypertext Transfer Protocol) services and Telnet services, are equally convenient. For example, a Telnet server would be monitored by using netstat (1) and the respective Telnet log file, /usr/adm/syslog/syslog.log. Because Internet servers are known to record activity to a log file, the aforementioned technique to effect a connection "time-out" tends to be pervasive in its applicability. However, in other embodiments, the scrambler may use another technique, now known or hereafter developed, to determine whether client connection to a translated port has been achieved within a predetermined interval of time.

Figure 3:
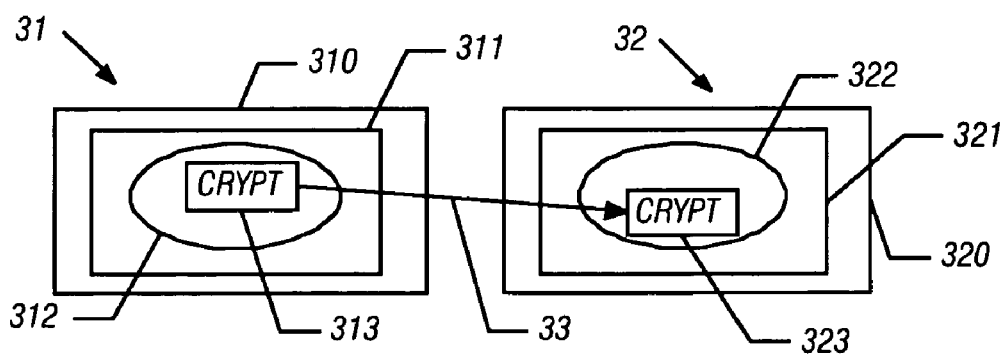
FIG. 3 is a system diagram illustrating the manner in which some embodiments of the invention may be implemented in a proprietary client/server architecture.

As indicated herein, an embodiment of the invention, as implemented above, is not predicated on access to either server or client source code. However, in alternative embodiments source code may be accessible. For example, source code would likely be available to embodiments that are deployed in proprietary client/server systems. In these instances, both the client and the server code may be assumed to be under the control of a common entity or enterprise. When source code is available, implementation becomes even more straightforward. FIG. 3 depicts an embodiment that is applicable to a proprietary client/server architecture.

Implementation details are, in salient respects, largely as described in the embodiment of FIGS. 2A and 2B. However, rather than using a wrapper script around the client, wrapper processing may be directly embedded in the client source code. Similarly, if warranted, the scrambler daemon may be embedded in the server service code. As may be seen in FIG. 3, a client system 31 comprises a client computer 310, on which there is installed a client 311. In circumstances where access to source code for client 311 may be had, client wrapper 312 may be embedded into, i.e., integrated with, client 311. In addition, client 311 may also, if warranted, comprise an encryption/decryption function 313. A server system 32 is coupled to client system 31 by communication link 33, which, in one embodiment, may be a secure communication link. Server system 32 comprises a server computer 320, on which there is installed a server application 321. In circumstances where access to the source code of server 321 may be had, scrambler daemon 322 may be embedded into, i.e., integrated with, server 321. In addition, server 321 may also, if warranted, comprise an encryption/decryption function 323.

Some embodiments of the invention are operable with any Internet server. In practical terms however, one might be somewhat disinclined to deploy the invention on Internet servers that are meant to be available to the general public. A consideration here is that servers in this category typically provide services where there does not exist prior knowledge of the hosts from which clients will attempt connection. Examples of such servers include email (tcp/25) and external web address (tcp/80).

However, embodiments of the invention are suited for private servers, such as:

| (client) | | (server) |
|---|---|---|
| application server | ←→ | back-end database |
| web server | ←→ | back-end database |
| Telnet | ←→ | Telnet |
| ssh | ←→ | Telnet |
| ffs | ←→ | FFS (proprietary server) |
| ftp | ←→ | FTP (private, non public FTP servers, e.g., the secret patch-loading FTP server) |

In addition, embodiments of the invention are not limited in its applicability to one type of server per machine. For example, if it is desired to execute, for example, three types of servers (FFS, Telnet, and FTP) in this manner on the same machine, three scrambler daemons are provided. Each of the daemons then listens on a respective port that is associated with the scrambler. For example, a multiple server/scramble configuration is illustrated in FIG. 2C, wherein:

Scrambler 212a→tcp/3000 (handles FFS clients);
Scrambler 212b→tcp/3001 (handles Telnet clients); and
Scrambler 212c→tcp/3002 (handles FTP clients).

Figure 2C:
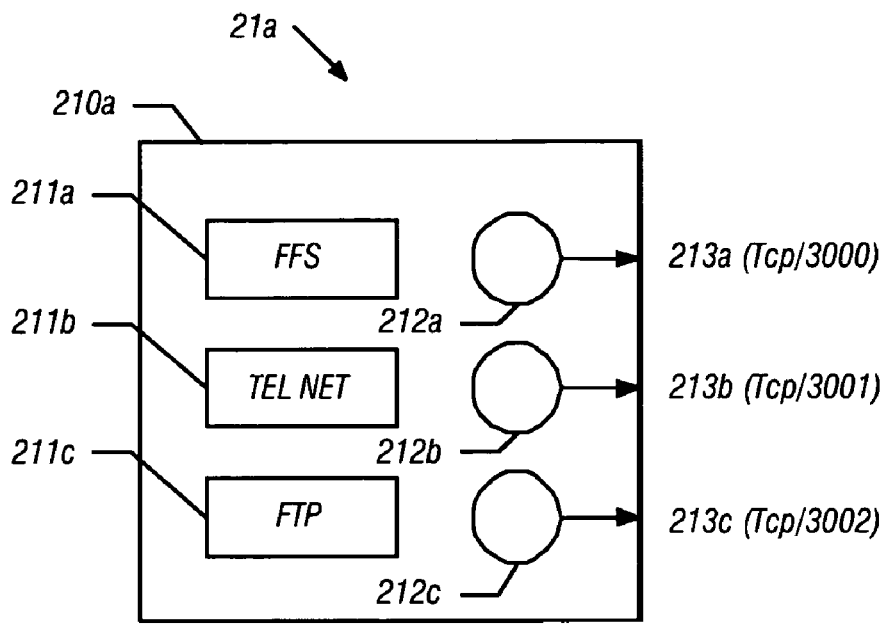
FIG. 2C is a graphical representation of an embodiment comprising multiple server applications.

That is, in the multiple server/scrambler configuration of FIG. 2C, a server system 21a comprises a server computer 210a. Installed on server computer 210a are, for example, an FFS server 211a, a Telnet server 211b, and an FTP server 211c. (For purposes of this Detailed Description, the designation "FFS" is intended as a generic reference to a proprietary server computer, such as may be made available by an enterprise to its customers, vendors or agents. For example, an FFS server computer may be deployed to deliver proprietary software to customers, enable customers to enter purchase or service orders, enable vendors to provide status reports, etc.) A respective scrambler daemon, i.e., one of scrambler daemons 212a, 212b, and 212c, is associated with each of the servers. In the configuration of FIG. 2C, FFS scrambler daemon 212a listens on a port 213a (e.g., tcp/3000); Telnet scrambler daemon 212b listens on a port 213b (e.g., tcp/3001); and FTP scrambler daemon listens on a port 213c (e.g., tcp/3002).

Notice that in some embodiments, the scrambler daemon accepts no inputs. This feature is calculated to maximize the robustness of the scrambler in a manner that offers immunity from buffer-overflow and authentication attacks. In this regard, a purpose of the scrambler is simply to attend to a respective well-known port (e.g., tcp/3000) in anticipation of a connection from the client wrapper. Thus, in one embodiment, it is suggested that there be provided a distinct scrambler for each type of client/server. The scrambler may be a very lightweight application, so that the additional computational resources imposed by the scrambler are negligible.

In an embodiment, before selecting a port number, the scrambler determines (e.g., via netstat (1)) that the port number has not already been made available to another process.

Figure 4:
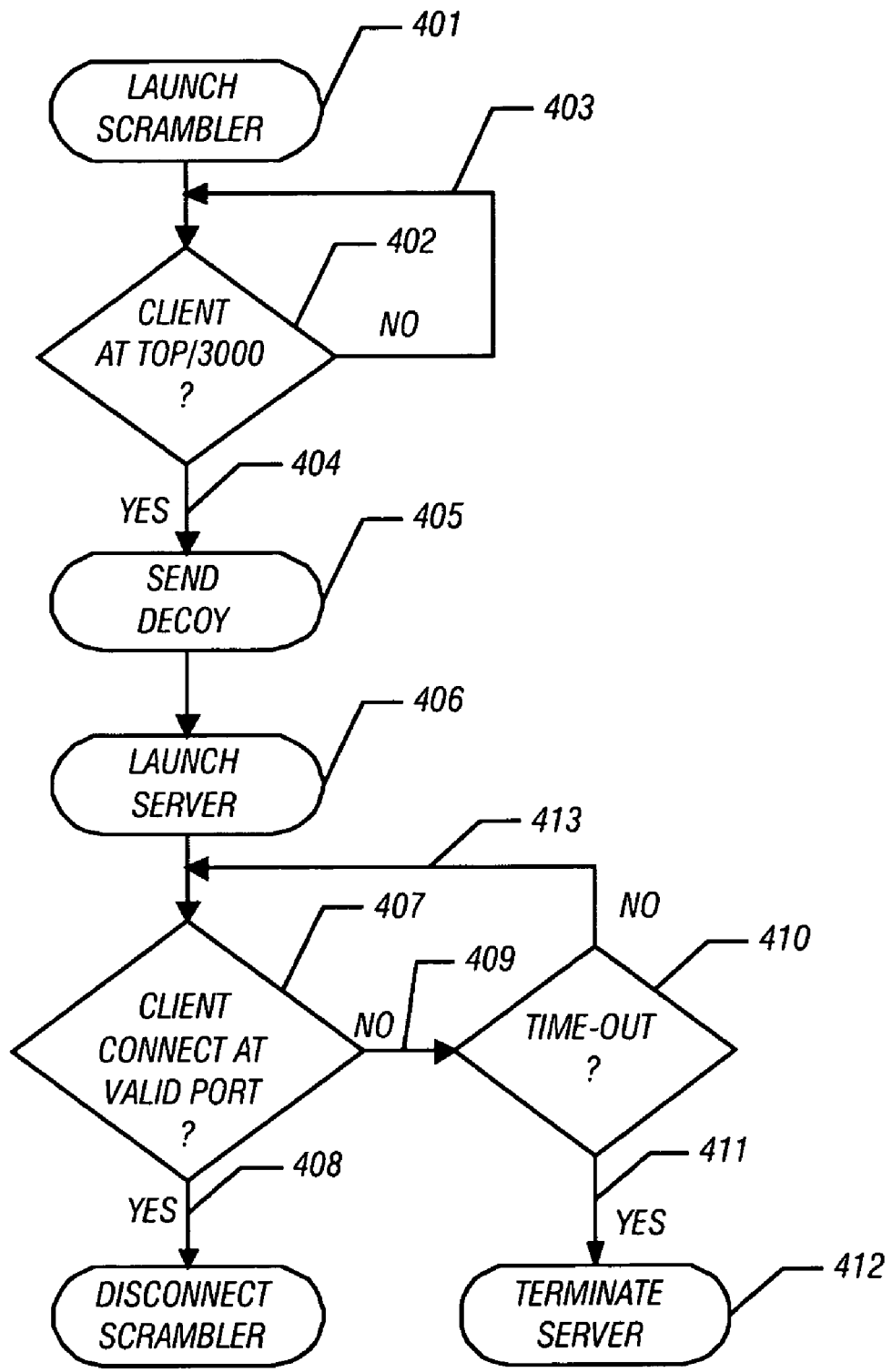
FIG. 4 is a flow diagram that illustrates a method to provide secure communications in accordance with an embodiment of the present invention.

Aspects of operation of embodiments of the invention may be seen pictorially with reference to FIG. 4. FIG. 4 is a flow diagram that defines of an embodiment of the operation of a scrambler daemon that is associated with a server application. Operation in accordance with FIG. 4 commences at step 401, wherein the scrambler daemon is launched on the server computer. At 402, the scrambler daemon listens at a port, e.g., tcp/3000, for an attempted connection by a client. (Understand here that a client attempting to obtain services from a server will initially attempt connection to the port at which the associated scrambler is expected to be listening.) If there is no attempt, at 403 the scrambler loops back to 402. However, upon an attempted connection by a client at 404, the scrambler, at 405, transmits a decoy port number, e.g. tcp/1026, to the client. At 406, the scrambler causes the associated server to be launched at a valid port number. At 407, the scrambler monitors the valid port for a client connection. If, at 409, there is no client connection, then, at 410, the scrambler determines whether the predetermined allotted time for a client connection has elapsed, i.e., whether there has occurred a "time-out". If not, then at 413 the scrambler loops back to 407. If there has been a time-out, scrambler branches at 411 to terminate execution of the associated server at 412. Alternatively, had there been a client connection at 407, the scrambler branches at 408 and disconnects from port tcp/3000.

Be aware that the above is intended to represent but one implementation. In other implementations, steps may be added, deleted, or reordered.

In the embodiments described above, a high level of security may be established by a one-step mapping procedure in which there is initially provided a decoy port number. A table, accessible to, or included with, both the client and the server, maps the decoy port number to a valid port number. In other embodiments, an even greater level of security may be gained by first using a table, such as has been described above, to map a decoy port number to an intermediate port number. Subsequent processing, which may involve one or more additional steps, maps the intermediate port number to a valid port number. The subsequent processing may take advantage of, or be based on, information or mechanisms that are known to both the server and to the client. However, the information or mechanism used for the subsequent processing from the intermediate port number to the valid port number may, or may not, be also available to others. However, unauthorized individuals or entities will not be privy to the manner in which that information is used to generate valid port numbers from decoy port numbers or from intermediate port numbers.

Numerous approaches may be used to process an intermediate port number to a valid port number. For example, it is typical of federated machines to maintain close time synchronization via NTP (Network Time Protocol). In embodiments of the invention, NTP synchronization information may be creatively exploited to further scramble the decoy port number. In one such embodiment, NTP synchronization information may be used in accordance with the methodology:

a) The scrambler randomly selects an entry (decoy port number) in the scrambler table (e.g., 1026);

b) Both the scrambler and the client map to a corresponding intermediate port number (e.g., 7029);

c) Both the scrambler and the client then add the current Greenwich Mean Time hour (e.g., at 3:12 pm GMT, add "3") to the intermediate port number;

d) The port number then becomes 7029+3=7032;

e) Both the scrambler and then client subtract the last octet of the client's IP address. That is, if the client is 15.24.13.9, subtract "9". The valid port number thus derived becomes (7032−9)=7023.

(The client IP address is automatically available to the server due to the nature of TCP/IP. In HP-UX, for example, the scrambler daemon is able to retrieve the client's IP address via the system call "getpeername (2)")

f) Finally, the scrambler launches the server on port tcp/7023, and the client connects to that port.

Accordingly, in the above scheme, scrambling is effected by selecting an intermediate port number through use of a table that is common to (e.g., appears in both) the client and the server, and subsequently imparting an offset to derive the valid port number. In the embodiment described above, the offset is imparted in a two-step process, wherein offset information is derived, first, from the GMT and, second, from the client IP address.

In some embodiments of the invention, the effect is to supplement, rather than displace, standard methods of securing Internet servers, which include, for example, authentication via username/password (or other schemes); restricting access to clients originating from trusted domains or IP ranges; and encryption of the, client/server datacomm (SSL, DES, Blowfish, etc).

Accordingly, some embodiments of the invention increase security without derogation of any of the prior security measures already in place. Furthermore, embodiments of the invention have been described herein as operable to effectuate client/server (request/response) communications over an encrypted link, such as SSL. However, insofar as the invention is deemed itself to afford more than adequate security in most circumstances, resort to link encryption may be foregone.

In addition, the scope of the invention admits of implementation, in whole or in part, by virtue of software programming. To that end, skilled practitioners recognize that embodiments may be realized in software (or in the combination of software and hardware) that may be executed on a host system, such as, for example, a computer system, a wireless device, or the like. Accordingly, such embodiments may comprise an article in the form of a machine-readable storage medium onto which there are written instructions, data, etc. that constitute a software program that defines at least an aspect of the operation of the system. The storage medium may include, but is not limited to, any type of disk, including floppy disks, optical disks, compact disk read-only memories (CD-ROMs), compact disk rewritables (CD-RWs), and magneto-optical disks, and may include semiconductor devices such as read-only memories (ROMs), random access memories (RAMs), erasable programmable read-only memories (EPROMs), electrically erasable programmable read-only memories (EEPROMs), flash memories, phase-change or ferroelectric memory, magnetic or optical cards, or any other type of media suitable for storing electronic instructions. Similarly, embodiments may be implemented as software modules executed by a programmable control device, such as a computer processor or a custom designed state machine.

It should be clear from above, that implementations disclosed herein are distinctly preferable to alternatives, such as attempting to protect a particular server by hiding the server on a non-standard port. A competent port-scan utility will likely detect a server "hidden" in this manner. However, implementations disclosed here are rendered immune to the effects of such devices, largely because the server is continually re-located from port to port, and furthermore, becomes accessible on a valid port only momentarily prior to connection by an authorized client.

In the foregoing Detailed Description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of effecting secure communications between a server and a client, the server executed in a server computer, the method comprising:
   detecting, at the server computer, a client connection at a first port;
   providing, by the server computer, the client with a decoy port number; and
   providing, by the server computer, services to the client on a second port having a second port number that is mapped to the decoy port number, wherein the second port number is different from the decoy port number; and maintaining, in the server computer, a table of available decoy port numbers that are mapped to valid port numbers wherein the table maintained in the server computer corresponds to a second table maintained at a client computer on which the client is executed, the second table mapping decoy numbers to valid port numbers at the client computer; monitoring the second port for a connection by the client, and
      if there is no connection by the client within a predetermined time interval, terminating execution of the server on the second port.

2. A method as defined in claim 1, wherein the decoy port number is provided to the client by the operation of a routine that is associated with the server, the routine executed in the server computer.

3. A method as defined in claim 2, further comprising: launching the server on the second port; and
   monitoring the second port for a connection by the client.

4. A method as defined in claim 3, further comprising: if there is no connection by the client within a predetermined time interval, terminating execution of the server on the second port.

5. A computer system comprising:
   a plurality of ports, each port having a respective port number; a server application; and a routine that, if executed, is operative to:
   detect a client connection at a fast port; provide the client with a decoy port number; and provide services to the client on a second port having a second port number that is mapped to the decoy port number, wherein the second port number is different from the decoy port number;
   maintaining, in the server computer, a table of available decoy port numbers that are mapped to valid port numbers wherein the table
   maintained in the server computer corresponds to a second table maintained at a client computer on which the client is executed, the second table mapping decoy numbers to valid port numbers at the client computer; monitoring the second port for a connection by the client, and
   if there is no connection by the client within a predetermined time interval, terminating execution of the server on the second port.

6. A computer system as defined in claim 5, wherein the routine, if executed, is operative to:
   launch the server application on the second port; and
   monitor the second port for a connection by the client.

7. A computer system as defined in claim 5, wherein the routine, if executed, is operative to:
   launch the server application on the second port subsequent to providing the decoy port number to the client.

8. A server computer system comprising: a plurality of ports, each port having a respective port number; a first server application; and
   a first routine that is associated with the first server application and that, if executed, is operative to: detect a client connection at a first port; transmit a decoy port number to the client; terminate the connection to the first port; and
   provide services to the client on a second port having a second port number that is mapped to the decoy port number, the second port number being a valid port number that is different from the decoy port number;
   a second server application; and
   a second routine that is associated with the second server application and that, if executed, is operative to: detect a client connection at a third port; transmit a second decoy port number to the client; terminate the connection to the third port; and provide services to the client on a fourth port having a fourth port number that is mapped to the second decoy port number, the fourth part number being another valid port number that is different from the second decoy port number; maintaining, in the server computer, a table of available decoy port numbers that are mapped to valid port numbers wherein the table maintained in the server computer corresponds to a second table maintained at a client computer on which the client is executed, the second table mapping decoy numbers to valid port numbers at the client computer; monitoring the second port for a connection by the client, and
   if there is no connection by the client within a predetermined time interval, terminating execution of the server on the second port.

9. A server computer system as defined in claim 8, wherein the first routine and the second routine, if executed are operable, respectively, to:
   terminate execution of the first server application on the second port if there is no client connection within a predetermined time interval; and
   terminate execution of the second server application on the fourth port if there is no client connection within a predetermined time interval.

10. A method executed by a client computer, comprising: attempting to access a server application on a first port of a server computer; receiving, from the server computer, a decoy port number that is an invalid port number; translating the decoy port number to a valid port number; and connecting to the server application on the valid port number; and maintaining, in the server computer, a table of available decoy port numbers that are mapped to valid port numbers wherein the table maintained in the server computer corresponds to a second table maintained at a client computer on which the client is executed, the second table mapping decoy numbers to valid port numbers at the client computer; monitoring the second port for a connection by the client, and
   if there is no connection by the client within a predetermined time interval, terminating execution of the server on the secondport.

11. A method as defined in claim 10, wherein the decoy port number is translated using a wrapper script associated with a client application in the client computer.

12. A method as defined in claim 10, wherein the decoy pot number is translated using code embedded in a client application in the client computer.

13. A method as defined in claim 10, further comprising: mapping the decoy port number to an intermediate port number; and effecting an offset to the intermediate port number to produce the valid port number.

14. A computer system comprising: a plurality of ports, each port having a respective port number; an application; and
means for effecting secure access to the application by redirecting a client from a first port to a second port, wherein the means for effecting secure access comprises:
a routine that, if executed, is operable to provide the client with a decoy port number that maps to a second port number of the second port, wherein the decoy port number is an invalid port number and the second port number is valid port number; and maintaining, in the server computer, a table of available decoy port numbers that are mapped to valid port numbers wherein the table maintained in the server computer corresponds to a second table maintained at a client computer on which the client is executed, the second table mapping decoy numbers to valid port numbers at the client computer; monitoring the second port for a connection by the client, and
if there is no connection by the client within a predetermined time interval, terminating execution of the server on the second port.

15. An article comprising a non-transitory machine-readable storage medium that comprises instructions that, if executed, cause n server computer to:
detect a connection at a first port of the server computer by a client application;
transmit, to the client application, a decoy port number, wherein the decoy port number is an invalid port number; and
cause a server application in the server computer to be launched at a second port that has a second port number mapped to the decoy port number, the second port number being a valid port number; and maintaining, in the server computer, a table of available decoy port numbers that are mapped to valid port numbers wherein the table maintained in the server computer corresponds to a second table maintained at a client computer on which the client is executed, the second table mapping decoy numbers to valid port numbers at the client computer; monitoring the second port for a connection by the client, and
if there is no connection by the client within a predetermined time interval, terminating execution of the server on the second port.

16. A client/server system comprising: a server computer system; and
a server application installed on the sever computer system and comprising instructions that, if executed on the server computer system, are effective to: detect a connection at a first port by a client application; transmit, to the client application, a decoy port number, wherein the decoy port
number is an invalid port number;
terminate the connection on the first port; and
provide services to the client application on a second port having a second port number that is mapped to the decoy port number; and maintaining, in the server computer, a table of available decoy port numbers that are mapped to valid port numbers wherein the table
maintained in the server computer corresponds to a second table maintained at a client computer on which the client is executed, the second table mapping decoy numbers to valid port numbers at the client computer; monitoring the second port for a connection by the client, and
if there is no connection by the client within a predetermined time interval, terminating execution of the server on the second port.

17. A client/server system as defined in claim 16, further comprising:
a client computer system; and
a client application installed on the client computer system and comprising instructions that, if executed on the client computer system, are effective to: attempt to access the server application on the first port; translate the decoy port number to the second port number; and connect to the server application on the second port.

18. A client/server system as defined in claim 17, wherein the client application further comprises instructions that, if executed on the client computer system, are effective to:
map the decoy port number to an intermediate port number, and
impart an offset to the intermediate port number so as to derive the second port number.

19. The method as defined in claim 1, wherein providing the decoy port number comprises providing the decoy port number that has no meaning to an unauthorized client computer, but the decoy port number is mappable to the second port number by an authorized client computer.

20. The computer system as defined in claim 5, wherein the decoy port number provided to the client enables the client to map, using a second table associated with the client, the decoy port number to the second port number such that the client can connect to the computer system at the second port number.

21. The computer system as defined in claim 5, wherein the decoy port number has no meaning to an unauthorized client computer, but the decoy port number is mappable to the second port number by an authorized client computer.

22. The article of claim 15, wherein the decoy port number is meaningless to an unauthorized client computer, but the decoy port number is mappable to the valid port number by an authorized client computer.

* * * * *

UNITED STATES PATENT AND TRADEMARK OFFICE
CERTIFICATE OF CORRECTION

PATENT NO. : 8,140,694 B2  
APPLICATION NO. : 10/800828  
DATED : March 20, 2012  
INVENTOR(S) : Ted C. Johnson Page 1 of 1

It is certified that error appears in the above-identified patent and that said Letters Patent is hereby corrected as shown below:

In column 9, line 46, in Claim 5, delete "fast" and insert -- first --, therefor.

In column 10, line 22, in Claim 8, delete "part" and insert -- port --, therefor.

In column 10, line 59, in Claim 10, delete "secondport." and insert -- second port. --, therefor.

In column 10, line 63, in Claim 12, delete "pot" and insert -- port --, therefor.

In column 11, line 14, in Claim 14, before "valid" insert -- a --.

In column 11, line 27, in Claim 15, delete "n" and insert -- a --, therefor.

In column 12, line 30, in Claim 18, delete "number," and insert -- number; --, therefor.

Signed and Sealed this  
Sixth Day of November, 2012

David J. Kappos  
*Director of the United States Patent and Trademark Office*